April 10, 1962  R. J. FORMANEK  3,028,902
TUBELESS TIRE CONTAINING A NON-WICKING FINISHING
STRIP AND METHOD OF MAKING THE SAME
Filed Oct. 22, 1954  2 Sheets-Sheet 1
FIG-1
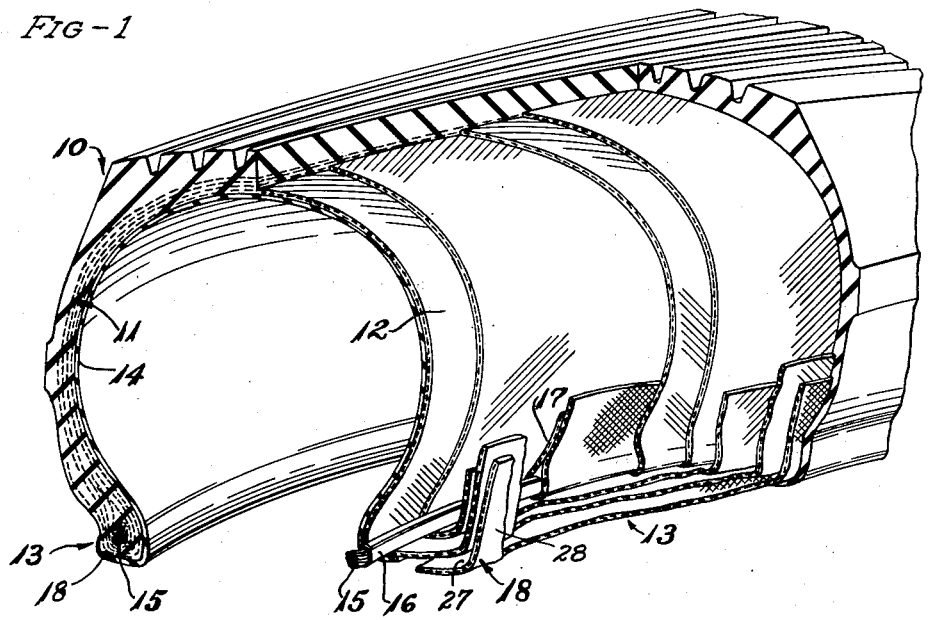
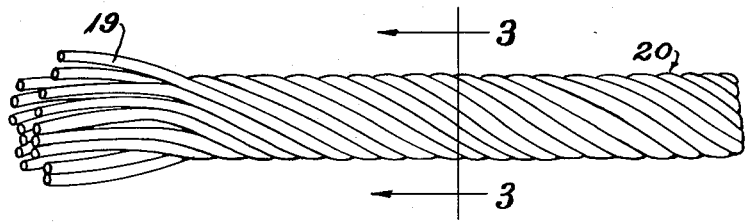
FIG-2
FIG-3
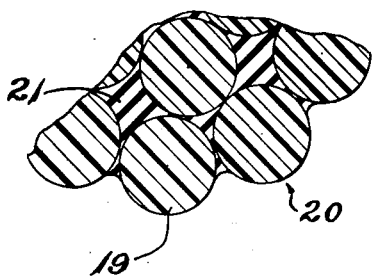
INVENTOR.
ROBERT J. FORMANEK
BY W. A. Shira, Jr.
ATTY.

April 10, 1962 R. J. FORMANEK 3,028,902
TUBELESS TIRE CONTAINING A NON-WICKING FINISHING
STRIP AND METHOD OF MAKING THE SAME
Filed Oct. 22, 1954 2 Sheets-Sheet 2
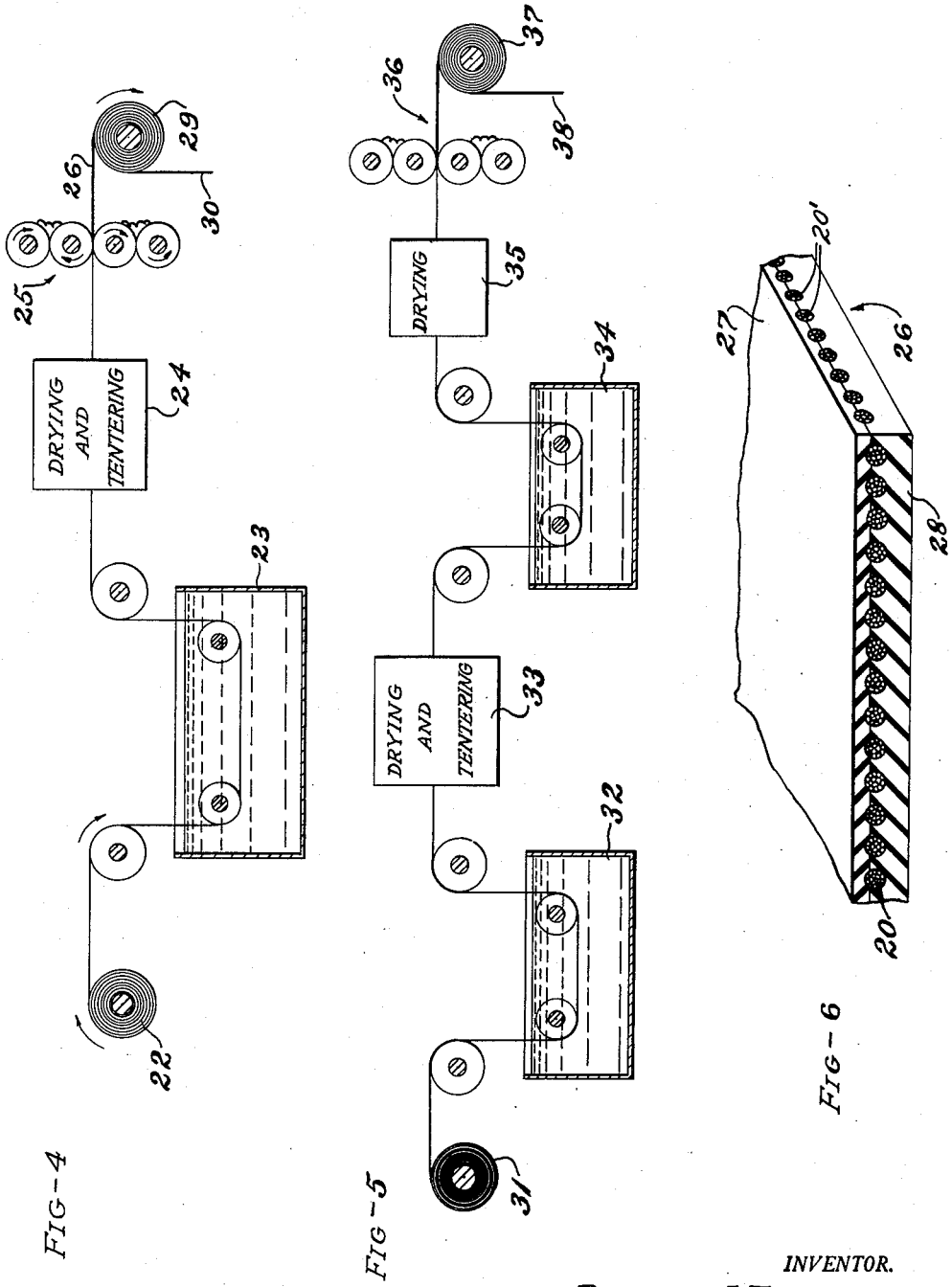
INVENTOR.
ROBERT J. FORMANEK
BY
W. A. Shira, Jr.
ATTY.

United States Patent Office 3,028,902
Patented Apr. 10, 1962

3,028,902
TUBELESS TIRE CONTAINING A NON-WICKING FINISHING STRIP AND METHOD OF MAKING THE SAME
Robert J. Formanek, Buffalo, N.Y., assignor to The B. F. Goodrich Company, New York, N.Y., a corporation of New York
Filed Oct. 22, 1954, Ser. No. 463,952
7 Claims. (Cl. 152—362)

This invention relates to preventing the passage or wicking of air or other fluid along or through cords formed of a plurality of twisted filaments and, more particularly, to the methods of effecting this result in finishing strips for tubeless tires, and to tires incorporating such strips.

Flexible materials and articles which are required to be impervious to air and other fluids frequently employ cords for the purpose of reinforcement. These cords are generally formed of a plurality of twisted filaments and may be utilized as discrete lengths but, more frequently, are in the form of weftless or woven fabrics, which are coated with an impervious substance. When the cords are completely covered by such a substance the imperviousness of the resulting material is determined solely by the characteristics of the coating substance. However, when a portion of a cord or cords is exposed as, for example, at the ends of the latter, the minute interstices between the twisted filaments thereof form passages through which air or other fluid may permeate. This not only results in loss of the fluid but also may cause injury to the material by producing separations between layers or plies thereof, formation of blisters, or like defects.

A tubeless pneumatic tire represents a specific example of an article in which the permeability or wicking of multiple filament cords has heretofore created serious problems. Such a tire utilizes the tire carcass and the wheel rim as the air chamber with the bead regions of the tire forming a seal with the rim. This region of a vehicle tire is subjected to a certain amount of stresses and/or chafing due to flexing of the tire in negotiating curves and irregularity in the roadway so that it is customary to provide a chafing or finishing strip for this region of the tire, which strip is composed of twisted multiple filament cords to impart strength and abrasion resistance. In conventional tire construction, the inner edges of such strips terminate within the air-containing chamber provided by the tire and rim while the outer edges extend externally of the tire carcass to a location above the rim flange and are generally covered by a layer of sidewall rubber. Consequently, if the ends or sides of the reinforcing cords in the chafer or finishing strips should be exposed, a passage is provided through the interstices of the cords for loss of air from the air chamber to the atmosphere or for passage of the air into the carcass of the tire where ply separations or blisters may result.

An object of the invention is to provide an improved non-wicking fabric for use as chafer or finishing strips in a tubeless vehicle tire, which fabric comprises a plurality of multiple filament cords, characterized by having the interstices between the filaments of each cord blocked to the passage of air by rubber disposed therein.

Another object of the invention is to provide an improved method of preparing non-wicking chafer or finishing strips for tubeless tires, which strips comprise a plurality of cords each of which is formed of a twisted bundle of filaments, the method comprising penetrating the interstices between the filaments with a liquid cement containing an elastomer, which elastomer is deposited within the interstices thus blocking the latter to the passage of fluid.

An additional object of the invention is to provide an improved method of preparing non-wicking chafer or finishing strips for tubeless tires by rendering the twisted bundle of filaments, comprising each cord of the fabric, impervious to the passage of fluid longitudinally between the filaments as the result of penetrating the interstices with a solution which increases adherence of the filaments to an elastomer and also penetrating the interstices with a dissolved elastomer so that the fabric, when dried, has an elastomer deposited in the interstices and adhered to the adjacent filaments thereby providing a barrier to the passage of fluid through the said instices.

A more specific object of the invention is to provide an improved tubeless pneumatic tire wherein loss of air is prevented through the incorporation in the tire of non-wicking chafer or finishing strips formed of multiple filament cords with the interstices between the filaments blocked to the passage of air by an elastomeric material deposited therein.

Other and further objects and advantages of the invention will be apparent to those skilled in the art to which it pertains from the following detailed description of the presently preferred embodiment thereof described with reference to the accompanying drawings, forming a part of this application, and in which:

FIG. 1 is a fragmentary perspective view of a portion of a pneumatic tire embodying the invention with parts of the tire being broken away at different locations to more clearly illustrate the construction;

FIG. 2 is an enlarged side view of a portion of a twisted multiple filament cord improved by this invention, the ends of the cord being frayed to more clearly show the filamentary nature thereof;

FIG. 3 is a greatly enlarged fragmentary transverse sectional view through the cord shown in FIG. 2, the view being taken substantially on the section indicating line 3—3 of FIG. 2 and showing the manner in which the interstices between the filaments of the cord are blocked in accordance with this invention;

FIG. 4 is a schematic illustration of one manner in which a fabric containing cords of the type shown in FIG. 2 may be treated prior to incorporation into a tire or other article;

FIG. 5 is a view similar to FIG. 4 showing a modified method and apparatus for treating a fabric prior to incorporation into a tire or other article; and FIG. 6 is an enlarged perspective view of a portion of an improved strip of material prepared in accordance with this invention and including the non-wicking cords or fabric.

Referring first to FIG. 1 of the drawings, the pneumatic vehicle tire illustrated therein includes a tread portion 10 surrounding an inner carcass 11 of resilient rubber and reinforcing cords the latter being disposed in cord plies such as 12. The inner periphery of the tire is defined by spaced bead portions 13 which are adapted to fit on the rim of a vehicle wheel and cooperate therewith to provide an air chamber without the need of a separate tube or container. Therefore, the interior of the tire carcass preferably is provided with a layer or lining 14 of an impervious elastomeric material such as the iso-olefin-diolefin copolymer commonly known as butyl rubber. It is to be understood that the term rubber when used herein and in the appended claims is, unless expressly stated otherwise, intended to cover mixtures and blends of the specific types of rubber mentioned and equivalent substances which are elastomeric in nature.

Each of the bead regions 13 of the tire is strengthened by a bead core 15 extending circumferentially about the tire and formed of bundles of wires. The cores are each covered by a wrapping 16 and each core also has a flipper strip 17 disposed thereabout with the ends of this strip extending radially of the side wall of the tire. The ends of the reinforcing cord plies 12 extend around the bead cores and flipper strips as is well known in the tire building art and one or more chafing or finishing strips 18 are provided externally of the plies in each bead region. These chafing or finishing strips extend beneath the beads to protect the tire from rim chafing due to flexing and other relative movement between the tire and rim on which it is mounted.

The construction thus far described, which has been employed heretofore in producing tubeless pneumatic tires, has frequently required special treatment in the bead region to prevent loss of air by wicking of the reinforcing cords in the chafer or finishing strips 18. That is to say, the chafer or finishing strips normally employed comprise a plurality of cords covered with rubber or other elastomer, each cord preferably being formed of a plurality of filaments 19 twisted together, as indicated for the cord 20 in FIG. 2, to provide strength and good fatigue resistance. Cords of this nature utilized either in weftless or, more preferably, in woven form may be completely covered externally with rubber or the like and still have the interstices between the individual filaments 19 open, this being especially true when the cords are formed of continuous fiber filaments such as rayon, nylon and the like. Consequently, when such cords, or fabric employing such cords, are employed in the finishing strips 18 any portions of the cords, such as at the edges of the strip, which may be open to the air contained within the tire provide access to the interstices between the filaments through which the air can permeate or wick. This results in loss of air from the tire to the atmosphere should be a portion of the cords be exposed externally of the tire, or if not thus vented the air thus permeating may form pockets within the carcass of the tire thereby producing ply separations and/or blisters which are highly detrimental to the life of the tire. In order to prevent such wicking or loss of air from the interior of the tire with the aforementioned attendant difficulties it has been necessary heretofore to insure that the ends of all cords employed in the tire carcass, and especially those in the chafer or finishing strips, be sealed so that air could not enter into the interstices between the cords. Neverthless, the chafing action to which the tire is subjected in the bead region thereof has frequently resulted in exposure of a portion of the reinforcing cords of the tire and especially in the finishing strips so that air could permeate or wick therethrough.

In accordance with this invention, the interstices between the cords utilized in the chafer or finishing strip of the tire are blocked to the passage of air by the depositing therein of an elastomer which is firmly adhered to the adjacent filaments as indicated at 21 in FIG. 3. This may be effected by a variety of different procedures. However, in the preferred form cord, or fabric employing cords, is dipped into a liquid cement containing a dissolved elastomer in a manner permitting permeation of the cement into the interstices, after which the cord, or fabric containing the cord, is dried so that the elastomer is deposited between the filaments. The adherence of the elastomer to the fibers is preferably facilitated by a prior penetration of the filaments with an adhesion-promoting substance or by the incorporation of such a substance in the liquid cement.

To further clarify the procedure by way of specific example, multiple filament twisted cord incorporated into a wiven fabric having spaced warp and weft cords 20, 20' is rendered non-wicking by passing the fabric from a supply roll 22 thereof (see FIG. 4) through a tank 23 containing a dissolved elastomer after which the fabric thus dipped passes through conventional drying apparatus 24 which may also include tentering equipment. The cord in this fabric will then have the interstices between the filaments 19 blocked to the passage of air or other fluids by the elastomer 21 which is deposited in the interstices as a result of the dipping and drying operation. The cord fabric thus prepared could be stored in this form until ready for use but in the preferred embodiment the dipped fabric when dry passes through a calendering apparatus 25 which provides the opposite sides of the fabric with layers of elastomer thereby forming a sheet or strip 26 of the type indicated in FIG. 6. The thickness of the elastomeric layers thus provided on the opposite sides of the fabric may be the same or different and the layers may be of the same or different elastomers.

When the strip 26 is to be employed for a tubeless tire one side of the fabric is preferably provided with a layer of an elastomer having a high fluid imperviousness, such as the copolymer of isoolefin-diolefin commonly known as butyl rubber, and the other side of the fabric may be provided with a layer of a different elastomer, such as natural rubber, GRS, neoprene, and the like. The butyl rubber provides a barrier to the penetration of fluid, such as air, transversely through the fabric or strip while the other elastomer is selected to provide desired characteristics such as chafe resistance and the like, the thickness of the layers being determined in accordance with the requirements for the strip. For example, the strip 26 shown in FIG. 6, which is to be employed as a chafer or finishing strip for a tubeless tire, has the warp cords 20 and the weft cords 20' thereof covered on one side by a relatively thin layer 27 of butyl rubber and on the other side by a somewhat thicker layer 28 of a different rubber such as natural rubber, GRS, or mixtures thereof.

The finishing strip 18 shown in FIG. 1 comprises a portion of the strip 26 with the elastomeric surface or layer 28 thereof outermost so that it is in a position to receive any chafing or wearing, the butyl layer being thereby protected so that its air-imperviousness is retained. In employing strips of this nature for the chafer or finishing strips of a tubeless tire no special care or precautions need to be taken to cover the edges of the cords 20 since these will not be subject to air wicking or permeation by the air even if portions of the cords be exposed because the interstices between the cords are blocked by the elastomer 21 deposited therein. The strip 26, may be cut to proper length and employed in tire manufacture as it issues from the calender or it may be disposed in rolls such as 29 with a lining material such as holland cloth 30 or the like interposed between successive convolutions of the strip. When thus rolled the finishing strip may be stored and handled in accordance with usual practices employed in preparing and handling other elastomeric coated fabrics.

As mentioned heretofore, the adhesion of the elastomer deposited within the interstices of the cords may be increased by employing a suitable adhesive compatible with the filaments and with the elastomer utilized. For example, adhesion may be promoted by employing the well-known resorcinol formaldehyde, with or without latex, in aqueous solution, or equivalent curing resins having the ability to cross bond may be employed. Likewise, isocyanate type adhesives or the casein type adhesives may be utilized and these may be employed simultaneously with the dissolved elastomer or as a separate step prior to dipping in the latter. Thus, as shown in FIG. 5, fabric from a roll 31 may be dipped first in a tank 32 containing an adhesive in liquid form after which the fabric is passed through a drying and tentering apparatus 33 and then is passed into a tank 34 of liquid cement containing a dissolved elastomer. Next, the fabric passes through drying apparatus 35 and calender 36 so that the final form of the material is similar to strip 26 of FIG. 6, the strip being either used immediately or wound upon a roll 37 with Holland cloth or the like 38 interposed between the successive convolutions.

The cement employed may be any suitable thin or free flowing liquid rubber cement of a consistency having approximately 8 to 10% solids and may be formed by masticating a suitably compounded rubber and dissolving it in a solvent of the petroleum type such as gasolene, naphtha, hexane, heptane, etc. In place of employing a compounded rubber the cement may be formed by utilizing crude rubber milled with reinforcing agents such as carbon black and curing agents such as sulfur and accelerators to provide a slab form which is then masticated and dissolved in a rubber solvent.

The improvement of adherence of the deposited elastomer 21 with the filaments 19 through the use of an adhesive may be effected as described in conjunction with FIG. 5. It is not, however, necessary that the treatment with the liquid adhesive be a part of a continuous process with the dipping in the liquid elastomer immediately following the adhesive dip. As a matter of fact, the treatment with the adhesive can be conducted at some time prior to, and as an entirely separate operation from the dipping in the cement since adhesives of the type mentioned will retain the desired characteristics for a considerable time after the fabric has dried. Moreover, it is not necessary that the adhesive and elastomer be applied as two separate steps since these may be combined through incorporating a suitable adhesive material in the liquid cement itself so that the fabric will be provided with both substances while passing through a single tank. This may be effected, for example, by employing resorcinol formaldehyde in an organic solvent phase so that it makes a completely homogeneous mixture with the liquid elastomeric cement. Thus, the resorcinol formaldehyde may be dissolved in methyl ethyl ketone or acetone. When thus utilized, no tentering operation need be performed upon the fabric since it would not be subjected to any substance that would cause shrinkage. Also, when the filaments employed are nylon, tentering need not be utilized since shrinkage is not generally a problem. Therefore, it is to be understood that the tentering indicated in FIGS. 4 and 5 is not an essential feature of this invention but is simply an auxiliary step employed where lateral shrinkage of the fabric is to be prevented.

The passage of the fabric through the liquid elastomer should be at substantially zero tension or at a sufficiently low tension so that the liquid elastomer can completely penetrate the interstices between the filaments of the cords and in this regard it should be noted that cords of singles yarn, namely that in which the filaments are twisted together as one bundle, are more easily penetrated by the liquid cement than are cords in which several bundles of twisted filaments are plied together. Nevertheless, the invention is not limited to cords comprising a single bundle of filaments but covers cords of all types, the important feature being the complete blocking of the interstices between the filaments to longitudinal penetration or passage of air or other fluids therethrough as the result of the deposition therein of an elastomer, which elastomer is adhered to the adjacent filaments and thus seals the interstices.

Cords blocked to the passage of air or other fluids in accordance with this invention may be employed either singly or in combinations. Thus, the cords may be incorporated into a weftless fabric held together by an elastomer calendered thereon or may be held by light, widely spaced, cross cords or picks. Likewise, the invention may be applied to cords which have been incorporated into open woven fabric either of the square woven type, leno weave or other conventional weaves employed for fabrics utilized as reinforcements. Hence, this invention is not to be considered as limited to examples herein described and illustrated except as may be required by the spirit and scope of the appended claims.

Having thus described the invention, I claim:

1. A tubeless pneumatic tire comprising a cord-reinforced rubber carcass having circumferentially extending beads, a fabric reinforced finishing strip covering each of said beads, the said strips each comprising a layer of butyl rubber on one face thereof and a layer of a chafe resistant rubber on the other face with a reinforcing fabric composed of a plurality of cords between said layers, the cords in said strips each comprising a plurality of twisted filaments with the interstices between said filaments blocked to the passage of air longitudinally of the cords by elastomeric material deposited therein from a solution of said elastomer, and the said strips being incorporated in said tire with the layer of said chafe resistant rubber on each outermost to provide a chafe-resisting surface.

2. A tubeless pneumatic tire comprising a cord-reinforced rubber carcass having circumferentially extending spaced beads, a substantially impervious rubber lining on the interior of said carcass, and an air impervious chafer or finishing strip covering each bead comprising superposed layers of butyl rubber and a chafe resistant rubber with a reinforcing fabric therebetween, the said fabric comprising spaced warp and weft cords with each cord consisting of a plurality of filaments twisted together and with the interstices between the filaments blocked to the passage of air longitudinally of the cords by an elastomer deposited therein from a solution of the elastomer, the said strips being incorporated in the tire with the said layer of chafe resistant rubber outermost on said beads to provide a chafe-resisting surface.

3. An inflatable tubeless tire comprised of a hollow body of resilient rubbery material open at the radial inner portion and having beads at the inner periphery thereof adapted to seat on a rim so that the tire and rim form an air chamber, each of said beads having a sheet of cords embedded in and completely surrounded by the rubbery material of the tire and folded around and positioned in close proximity to the surfaces of the bead which engage the bead seat and rim flange of the rim, each said cord having interstices whereby in the untreated condition it is normally pervious to air along its length and terminating at one end at a location adjacent to the toe portion of a bead and at the other end at a location adjacent to a sidewall of the tire to form support for the surfaces of a bead resting on the rim, said interstices being completely filled with a composition comprising both a cord-to-rubber bonding agent and a rubber cement which composition bars the passage of air along the length of said cords whereby air is prevented from escaping from said air chamber along the cords to deflate and injure the tire.

4. The method of manufacturing a tubeless tire comprising the steps of providing a fabric formed of discrete bundles of filaments with the interstices between the filaments pervious to air, dipping the fabric in a solution which increases adherence of filaments to elastomers in a manner such that said solution penetrates between the individual filaments of the fabric, drying the dipped fabric, dipping the fabric into a liquid cement containing elastomer in solution until the cement has completely penetrated between the individual filaments of the fabric, drying the fabric while the cement is present in the said interstices so that the cement is deposited in said interstices and adhered to the adjacent filaments, calendering a layer of rubber on both sides of said dipped and dried fabric, providing an uncured cord-reinforced rubber tire carcass having spaced beads, and applying a strip of said dipped, dried and calendered fabric externally over the bead portions of the tire carcass.

5. The method of manufacturing a tubeless tire comprising the steps of providing a fabric formed of discrete bundles of filaments with the interstices between the filaments pervious to air, dipping the fabric into a solution containing both a dissolved elastomer and a substance which increases adherence of the filaments to elastomers until the solution has completely penetrated the interstices between the individual filaments of the fabric, drying the fabric while the dissolved elastomer is present in the said interstices so that the elastomer is deposited in said interstices and adhered to the adjacent filaments thereby blocking the passage of air therethrough, calendering a layer of rubber on both sides of the dipped and dried fabric, providing an uncured cord-reinforced rubber tire carcass having spaced beads, and applying a strip of said dipped, dried and calendered fabric externally over the bead portions of the tire carcass.

6. The method of manufacturing a tubeless tire comprising the steps of providing a fabric having spaced warp and weft textile cords each formed of a plurality of filaments twisted together, dipping said fabric into a solution containing a dissolved elastomer until the solution has completely penetrated the interstices between the individual filaments of the fabric, drying the said fabric while the dissolved elastomer is present in the said interstices so that the elastomer is deposited in the interstices between the filaments thereby blocking passage of air therethrough, calendering a layer of butyl rubber on one side of the fabric and a layer of a chafe-resistant rubber on the other side of the fabric thereby forming a composite material impervious to the passage of air, providing an uncured cord-reinforced rubber tire carcass having spaced beads and an interior layer of air-impervious rubber extending to said beads, and applying a strip of the said composite material externally over each bead portion of the tire carcass with the said layer of butyl rubber on the fabric innermost and contacting the said layer of air-impervious rubber of the carcass.

7. The method of manufacturing a tubeless tire comprising the steps of providing a fabric having spaced warp and weft cords each formed of a plurality of textile filaments twisted together, dipping said fabric in a solution containing a substance which increases the adherence of the filaments to elastomers in a manner such that the said solution penetrates between the individual filaments of the fabric, drying the fabric, dipping the fabric into a liquid containing a dissolved elastomer until the liquid has completely penetrated the interstices between the filaments of the fabric, drying the fabric while the dissolved elastomer is present in said interstices so that the elastomer in said interstices is adhered to the filaments and blocks the interstices therebetween to passage of air therethrough, calendering a layer of rubber on both sides of the said dipped and dried fabric, providing an uncured cord-reinforced rubber tire carcass having spaced beads and an interior layer of air-impervious rubber extending to said beads, and applying a strip of the said dipped, dried and calendered fabric externally over each bead portion of the tire carcass with the said strips contacting the edge portions of said air-impervious layer of the carcass.

References Cited in the file of this patent

UNITED STATES PATENTS

| | | |
|---|---|---|
| 2,128,635 | Charch et al. | Aug. 30, 1938 |
| 2,137,339 | Gwaltney | Nov. 22, 1938 |
| 2,211,951 | Hershberger | Aug. 20, 1940 |
| 2,277,145 | Pierce | Mar. 24, 1942 |
| 2,499,724 | Compton | Mar. 7, 1950 |
| 2,541,550 | Sarbach et al. | Feb. 13, 1951 |
| 2,587,428 | Antonson | Feb. 26, 1952 |
| 2,592,844 | Antonson | Apr. 15, 1952 |
| 2,601,394 | Hansen | June 24, 1952 |
| 2,691,614 | Wilson | Oct. 12, 1954 |
| 2,739,918 | Illingworth | Mar. 27, 1956 |
| 2,902,073 | Lessig | Sept. 1, 1959 |